Feb. 18, 1969   E. J. SAXL   3,427,875
MULTIPURPOSE LOAD CELL
Filed July 18, 1966   Sheet 1 of 3
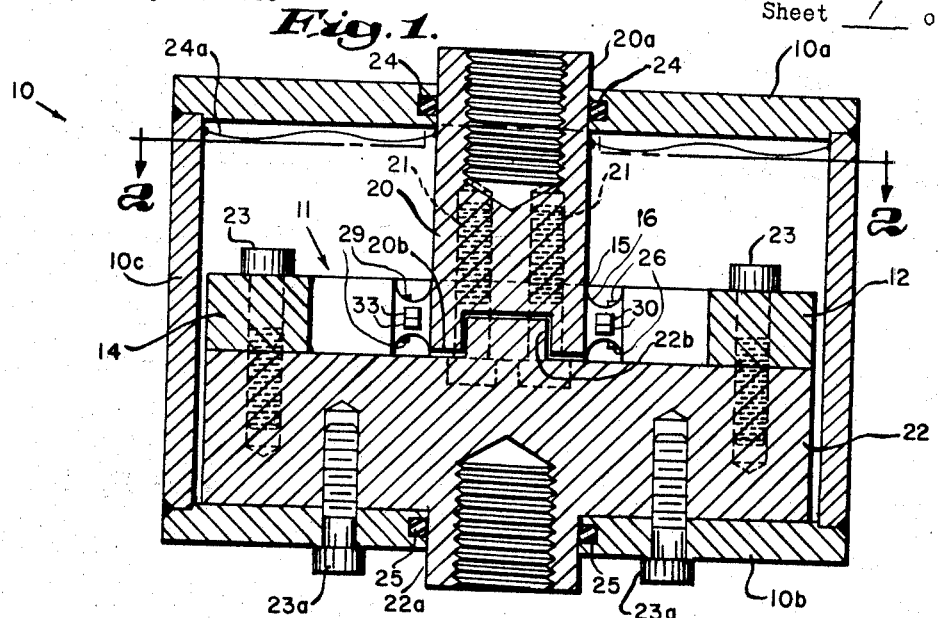
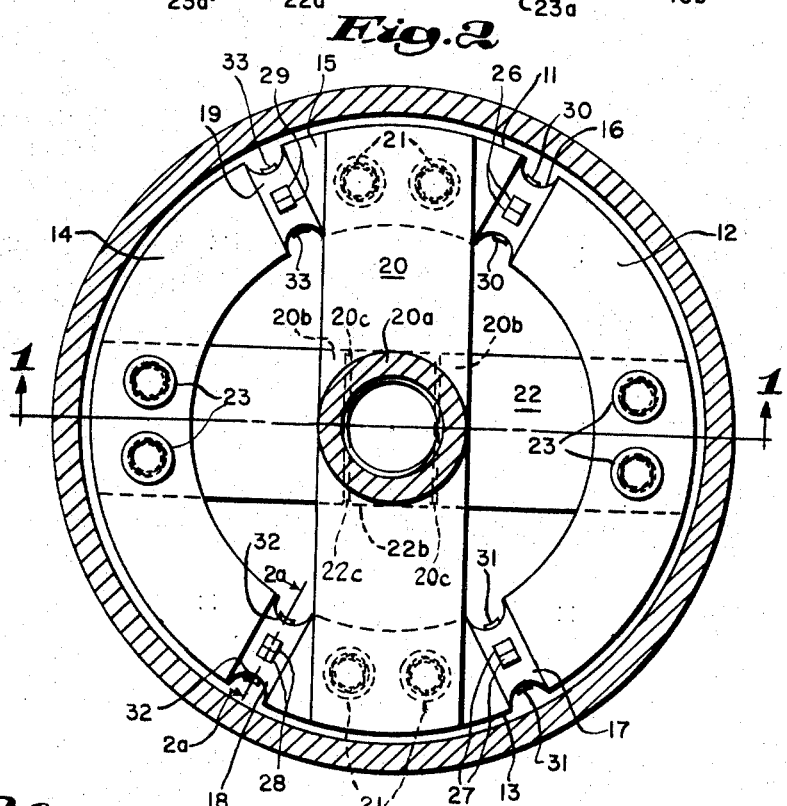
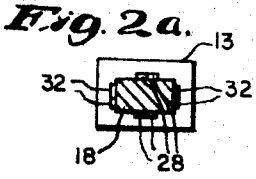
Inventor:
Erwin J. Saxl,
by Walter J. Kreske
Attorney Feb. 18, 1969    E. J. SAXL    3,427,875
MULTIPURPOSE LOAD CELL
Filed July 18, 1966    Sheet 2 of 3
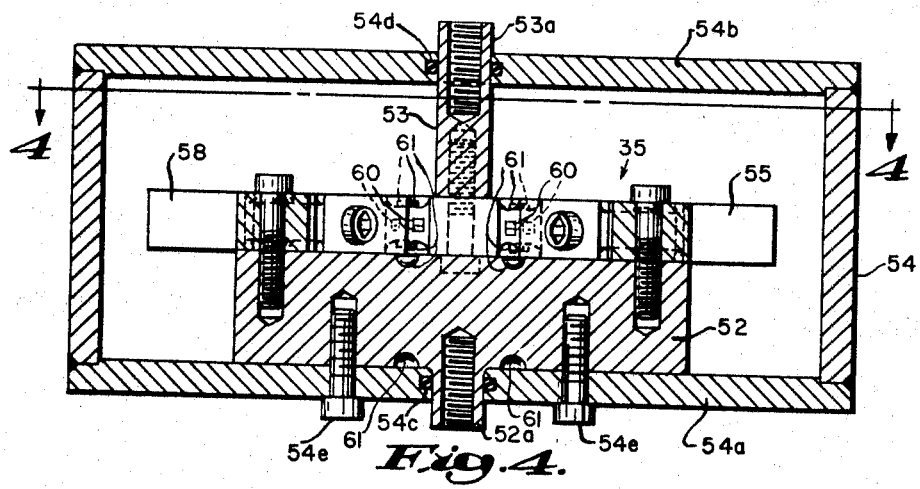
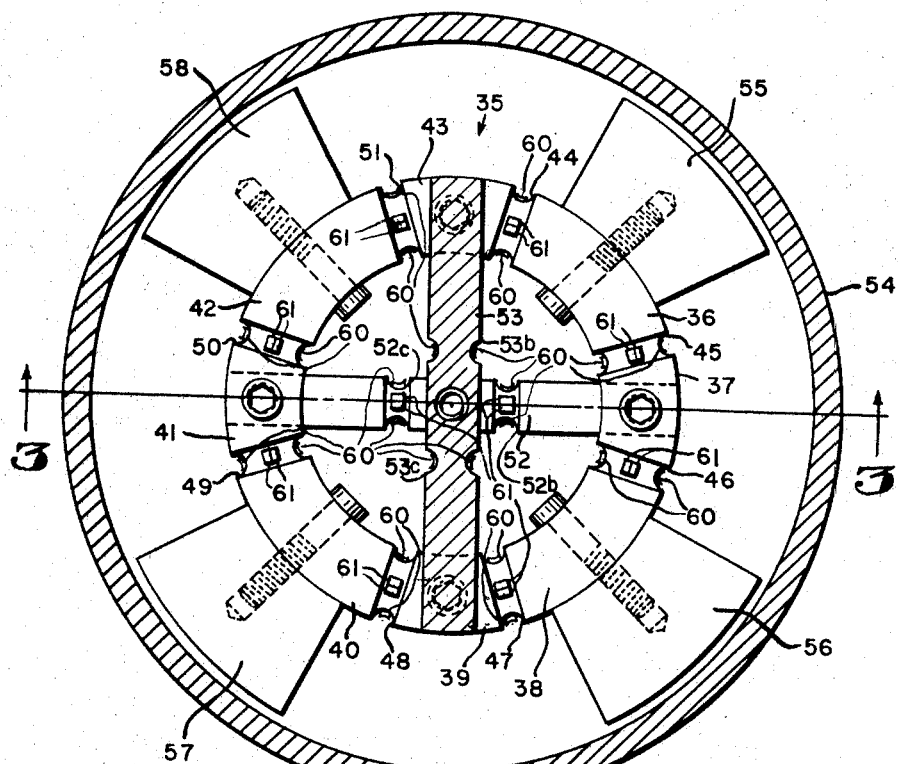
Inventor:
Erwin J. Saxl,
by Walter J. Kreske
Attorney Feb. 18, 1969  E. J. SAXL  3,427,875
MULTIPURPOSE LOAD CELL
Filed July 18, 1966 Sheet 3 of 3
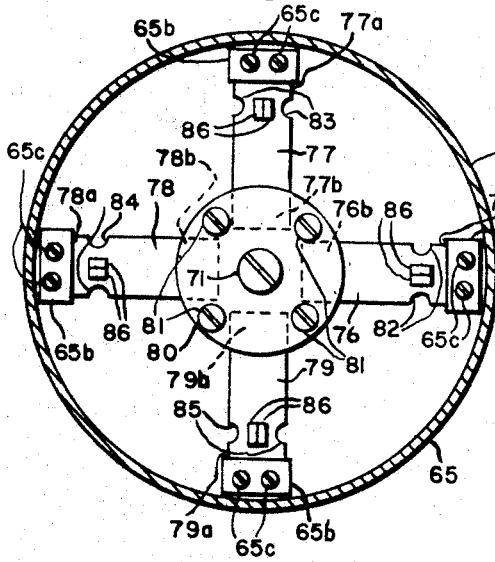
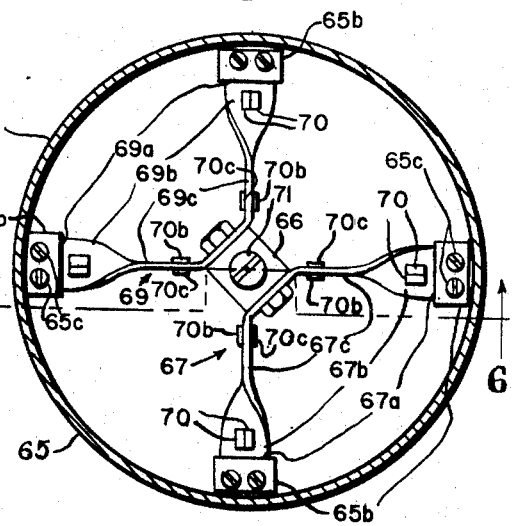
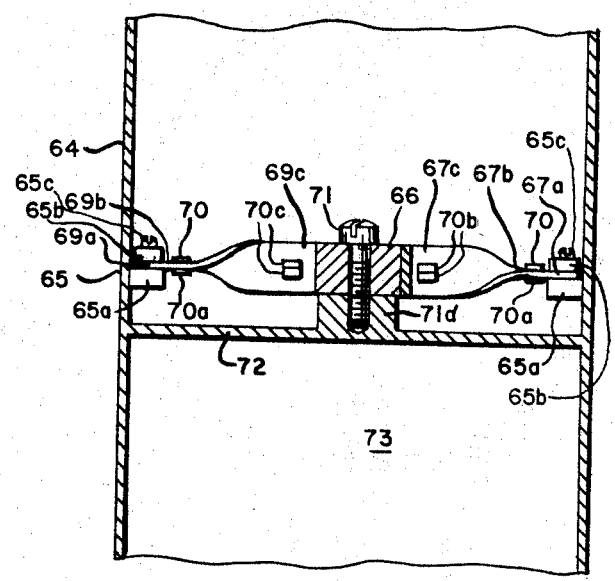
Inventor:
Erwin J. Saxl,
by Walter J. Kreske
Attorney

United States Patent Office 3,427,875
Patented Feb. 18, 1969

3,427,875
MULTIPURPOSE LOAD CELL
Erwin J. Saxl, P.O. Box 185, Harvard, Mass. 01451
Filed July 18, 1966, Ser. No. 565,757
U.S. Cl. 73—141    15 Claims
Int. Cl. G01l *5/12, 9/00;* G01p *15/08*

ABSTRACT OF THE DISCLOSURE

Force measuring load cells having a plurality of load sensing beams of either circular ring or spider configuration, each beam of which includes with respect to the direction of force to be measured a relatively rigid apex portion and a base portion between which is a relatively flexible portion with strain gages arranged about the flexible portion in a plurality of positions for imparting, in cooperation with the flexible portion, to a single load cell a capacity for measuring a plurality of load types such as tension, compression and torque loads.

---

This invention relates to load cells for both light and heavy loads and more particularly to improved load cells having capacity for handling tension, compression, pressure, vacuum, torque, acceleration, deceleration, centrifugal, centripetal loads and any combination thereof in the same load cell.

By load cell as herein used is meant a configuration of components forming a combination utilizing strain gage measurement of change in dimension due to elastic deformation of one or more of its members from an applied load to determine the value of the load.

In my U.S. Patent No. 3,280,623 issued on Oct. 25, 1966, entitled, Load Cell for Measurement of Low Forces, is disclosed load cell configurations utilizing electric strain gages bonded to single load columns, parallel load columns and V type load columns to achieve a variety of light tensile and compression load measuring applications. The structures therein disclosed entail the anchoring of one end of each load column in a rigid base with the other end of the load column adapted to receive the load to be measured.

The present invention extends the useful range of applications of load cells to the measurement of both heavy as well as light loads and broadens the capability of a single load cell to the measurement of a wider variety of load types such as compression, tension and torque loads under both static and dynamic load conditions and including acceleration, deceleration, centrifugal and centripetal loads.

A primary object of the preset invention is the provision of a load cell structure having capacity for measuring tension, compression, torque, acceleration, pressure, deceleration, centrifugal and centripetal loads or any combination thereof with the same load cell.

A further object is the provision of a load cell structure which is readily adaptable for both heavy and light load measurements.

Another object is the provision of a load cell structure having a high stress concentration at the areas of strain measurement for providing a wide range of strain values.

And a still further object is the provision of a load cell structure which is rugged and reliable in its operation and having a long life of accurate response even under corrosive environmental conditions.

These objects, features and advantages are achieved generally by the provision of at least two load sensing beams with each beam having a pair of base portions and an intermediate apex portion with the base and apex portions being relatively rigid in the direction of the force to be measured, each of the beams having a relatively flexible portion to direction of the load force and located between each of the base and apex portions, the flexible portions having strain gages bonded thereto for measuring minute changes in dimension caused by the forces being measured.

By bonding these strain gages in pairs, a relatively simple arrangement for neutralizing errors by averaging output is thereby achieved.

By taking strain gage signals out from different parts of the structure, built-in redundancy is achieved in separate and independent systems for effecting greater accuracy and reliability of output.

By providing stops positioned for limiting deflection of the flexible portions to a selected maximum value, damage from accidental overloading is thereby avoided.

By making the beams of curvilinear shape and connected end to end in the form of a ring, a relatively inexpensive, extremely rugged and reliable unitary structure is thereby achieved which is particularly suitable for heavy duty use.

By coupling a rigid cross member to the apices and another rigid cross member to the bases of the two beams in the ring, a simple and convenient arrangement for applying a load to the beams for measurement is thereby achieved.

By providing an adapter on each of the cross members for coupling to a load substantially centrally of the ring desirable uniformity of load distribution to the ring is thereby achieved.

By making each of the beams as a quarter circular section of the ring and fixing a weight to the apex of each of the beams added sensitivity to acceleration, deceleration, centrifugal and centripetal reactions of the beams to motion of the ring is thereby achieved.

By providing notches in the beams for effecting reduced cross sectional area at the portions of desired flexure to a load, a relatively simple and effective arrangement for making the ring sensitive to a selected combination of load types is thereby achieved, as well as effecting the degree of sensitivity to such loads.

By making the beams of strip material with the apex portions rigidly fixed adjacent each other with legs extending therefrom at substantially right angles in a spider-like structure, a useful arrangement for relatively light loads is thereby achieved.

By providing a quarter twist in each of the legs, a suitable configuration for measuring both torque and axial loads in the same load cell is thereby achieved.

These and other features, objects and advantages will be better understood from the following description taken in connection with the accompanying drawings and wherein:

FIG. 1 is a cross sectional view of a preferred embodiment of the invention taken on line 1—1 of FIG. 2;

FIG. 2 is a view taken on line 2—2 of FIG. 1;

FIG. 2a is a cross sectional view taken on line 2a—2a of FIG. 2;

FIG. 3 is a cross sectional view of an alternative embodiment of the invention taken on line 3—3 of FIG. 4;

FIG. 4 is a view taken on line 4—4 of FIG. 3;

FIG. 5 is a plan view of another alternative embodiment of the invention;

FIG. 6 is a cross sectional view of the FIG. 5 embodiment taken on line 6—6 of FIG. 5;

FIG. 7 is a plan view illustrating a further embodiment of the invention.

Referring to FIGS. 1 and 2 in more detail, a load cell in accordance with the present invention is shown housed in an hermetically sealed housing generally indicated by the numeral 10. The load responsive beam is a ring, generally indicated by the numeral 11, of rectangular cross section as shown in FIG. 2a. The ring is divided into four segments, 12, 13, 14 and 15, with intervening reduced portions, 16, 17, 18 and 19, preferably of a rectangular cross sectional shape shown in FIG. 2a. Segments 13 and 15 are connected together by a cross bar 20, secured to the segments by sets of bolts 21. Segments 12 and 14 are connected together by a cross bar 22, secured to the segments by sets of bolts 23. Also, cross bar 22 is preferably bolted to the bottom wall 10b of housing 10 by a set of bolts 23a.

Cross bar 20 has a circular boss 20a protruding through an opening in the top wall 10a of the housing 10. The opening is sealed by an O-ring 24 and where desired, positive seal may be insured by a flexible metal membrane or diaphragm 24a brazed to the side wall 10c of the housing 10 and to the cross bar 20. Cross bar 22 has a boss 22a projecting downward through the bottom wall 10b of the housing 10 and sealed by an O-ring 25 and may, if desired, also have a positive seal diaphragm (not shown) such as 24a.

Bosses 20a and 22a are internally threaded to facilitate attachment of a loading member and a supporting member (not shown). The top surface of the bar 20 is spaced from the underside of top wall 10a an amount sufficient to permit deflection of the load ring under axial tension loads within the operating range of the ring 11 and to contact top wall 10a for tension loads above the operating range of the ring 11 to thereby prevent injury to the ring 11 from such excessive loads. For compression loads in excess of the operating range of the ring 11, a spacer lug 20b on cross bar 20 makes contact with a spacer lug 22b on cross bar 22 to avoid injury to the ring 11. Also, for torque loads in excess of the operating range of the ring 11, the sides 22c of spacer lug 22b will engage the sides of slot 20c in the spacer lug 20b to prevent injury to the ring 11.

Pairs of strain gages, which may be of any well known electric resistance type, 26, 27, 28 and 29 are mounted on the upper and lower surfaces of each of the reduced portions 16, 17, 18 and 19 respectively. Additional pairs of strain gages 30, 31, 32 and 33 are mounted on the inner and outer surfaces of reduced portions 16, 17, 18 and 19 respectively for measurement of torque by means of the load cell as will be later described.

The operation of the load cell for measuring compression forces in the axial direction of the ring is as follows. The bottom end of boss 22a of the lower bar 22 is mounted on a rigid support and the compression load applied against the end of the boss 20a of the upper bar 20. Also, for both compression and tension loads, the load cell may be coupled by means of the threads in bosses 20a and 22a to threaded male members (not shown) in which the load is to be measured appears. An axial load, for example a compression load, applied to bar 20 is transmitted to segments 13 and 15 causing the ring to bend primarily in the regions of reduced cross section 16, 17, 18 and 19. Under a compression load applied to bar 20, the upper surfaces of the reduced regions will be in tension and the lower surfaces in compression. The resulting electric signal produced by the pairs of strain gages 26, 27, 28 and 29 are added and transmitted to an indicating device by means of circuits of any well known type used for this purpose. The two cross bars 20 and 22 are practically rigid and the ring segments 12, 13, 14 and 15 are considerably more rigid than the reduced portions 16, 17, 18 and 19 so that practically all the bending stress is concentrated in the areas of the strain gages. It is immaterial whether the load is applied exactly concentrically on boss 20a because the cumulative signal from the four pairs of strain gages is not affected by eccentricity of the load.

The ring in effect is composed of a pair of semi-circular beams having rigid base portions connected together and rigid apex portions to which the load to be measured is applied. The apex portions are connected to the base portions through the portions of reduced cross section 16, 17, 18 and 19 where bending primarily takes place. In the load cell shown in FIGS. 1 and 2, bar 22 may constitute the rigid support and the load may be applied to bar 20, or the load cell can be reversed so that bar 20 becomes the support and bar 22 is used as the loading bar. Segments 12 and 14 may be considered the bases of the load beams and sections 13 and 15 the apices. Conversely, sections 13 and 15 may be considered as the bases and sections 12 and 14 as the apices. With the reduced cross section portions being close to one of the cross bars 20 a cantilever beam structure is achieved for providing increased bending at the reduced cross sectional portions.

To measure torque by means of the load cell, bosses 20a and 22a may be connected to two shafts between which the torque is to be measured. A torque applied to cross bar 20 in such a direction as to turn it clockwise with respect to bar 22, as viewed in FIG. 2, gives rise to tension across the reduced areas 17 and 19 and compression on the reduced areas 16 and 18. By use of suitable resolving circuitry of known type, the resulting signals from the pairs of strain gages 26, 27, 28 and 29 may be made cumulative. Preferably for torque measurement, the apirs of strain gages 30, 31, 32 and 33 are also connected into the circuit to give an additional signal.

FIGS. 3 and 4 illustrate a load cell modified for measurement of either rotary speed or acceleration in the axial direction of the ring or rotary acceleration of the ring, as well as axial and compression load measurements described in connection with FIGS. 1 and 2 above. The ring, generally indicated by the numeral 35, is divided into eight segments, 36, 37, 38, 39, 40, 41, 42 and 43, connected together by intervening portions of reduced cross section 44, 45, 46, 47, 48, 49, 50 and 51. A cross bar 52 connects the diametrically opposite segments 37 and 41 and may also have portions of reduced cross sections 52b and 52c. A second cross bar 53 connects the diametrically opposite segments 39 and 43 and may also have portions or reduced cross section 53b and 53c. The load cell is mounted in a housing 54 and cross bar 52 has a circular boss 52a extending out through the bottom wall 54a of the housing 54 with an O-ring 54c as the seal. Cross bar 53 has a circular boss 53a extending out through the top wall 54b of the housing 54 with another O-ring 54d as the seal. Also, cross bar 53 is bolted to the bottom housing wall 54 as by screws 54e.

Mounted on segments 36, 38, 40 and 42 are weights 55, 56, 57 and 58. Pairs of strain gages 60 are mounted on the inner and outer surfaces of each of the reduced portions 44, 45, 46, 47, 48, 49, 50 and 51 of the ring 35 and of reduced portions 52b, 52c, 53b and 53c of cross bars 52 and 53. Other pairs of strain gages 61 are mounted on the upper and lower surfaces of these reduced portions.

The load cell in this form consists essentially of four quarter circular beams, each having a rigid pair of base portions and an apex portion connected to the base portion through the portions of reduced cross section. The baseportions of adjacent beams are connected together. Segments 37, 39, 41 and 43 constitute the connected base portions and segments 36, 38, 40 and 42 the apices.

To use the load cell of FIGS. 3 and 4 for measuring rotary speeds, one of the bosses 53a or 52a is connected to a rotating shaft. The function of the cell in this case does not depend on relative movement between bars 52 and 53. By removing the screws 54e, the load cell assembly may rotate with the shaft on which it is desired to measure rotary speed with the housing 54 stationary, or by leaving the screws 54e in place, the entire housing and load cell assembly may rotate. When the load cell is rotated, the weights 55, 56, 57 and 58 apply radial stress to segments 36, 38, 40 and 42, placing the intervening reduced portions 44, 45, 46, 47, 48, 49, 50 and 51 under tension. The resulting signal of the pairs of strain gages 60 is added by well known circuitry to give an indication of the strain in the reduced areas which is proportionate to the speed of the rotating shaft. Further sensitivity to such rotary speed may be obtained by adding the pairs of strain gages 61 to that of the pairs of strain gages 60 and including those on the cross bars 52 and 53. The inertia of weights 55, 56, 57 and 58 also provide a torque response to the cell both for rotary accelerations and decelerations which make possible the measurement of such rotary accelerations and decelerations by strain gage measurement as described in connection with torque measurement in FIGS. 1 and 2 above.

To measure acceleration in the axial direction of the ring 35, the load cell is mounted in any convenient manner on a body which is subject to acceleration in that direction. Acceleration in the downward direction, for example, causes the inertia of weights 55, 56, 57 and 58 to exert an upward bending stress on the reduced portions and the resulting signal is transmitted from pairs of strain gages 61 to an appropriate indicator. The device thus becomes an accelerometer.

The ring 35 can also be used to measure axial loads on the cross bars 52 and 53 by applying the technique described above in connection with axial loads on the cross bars 20 and 22 in FIGS. 1 and 2. Such loads may also be measured by the strain gages 61 on reduced sections 52b, 52c and 53b, 53c alone. Thus by the use of well known techniques, selective combinations of strain gages may be used to achieve the measurement of substantially any desired load conditions. From this aspect, the load cell in FIGS. 3 and 4 may be considered as having a universal load measuring applicability.

The form of load cell shown in FIGS. 5 and 6 is illustrated in a practical use arrangement with a cylinder 64, a portion of which may be considered a ring 65 carrying, 90 degrees apart, rigid blocks 65a which, together with a rigid center block 66, are connected together by two load beams made of flexible stripping such as spring steel. One of the beams, generally indicated by the numeral 67, has base portions 67a fixed to the ring blocks 65a by clamping members 65b and screws 65c. Next to the base portions are flat portions 67b which are free to bend in the axial direction of the ring. Beyond portions 67b the strip is given a 90 degree twist to form an apex portion 67c which is substantially rigid in the axial direction of the ring and free to bend under torque loads. The other beam 69 is formed in a similar manner and has 90 degrees apart base portions 69a fixed to ring blocks 65a by clamping members 65b and screws 65c with flat portions 69b sensitive to axial loads and an apex portion 69c which is rigid in the axial direction of stress but sensitive to torque loads. Pairs of strain gages 70 and 70a are mounted on top and bottom surfaces respectively of the flat portions 67b and 69b of both beams for measuring axial loads. Pairs of strain gages 70b and 70c are mounted on the left and right surfaces respectively of apex portion 67c and 69c for measuring torque loads. The apices of the beams are rigidly connected together by block 66 which is rigidly fixed by screw 71 to a lug 71a carried centrally of partition 72 in the cylinder 64.

A force supplied in the axial direction of the ring 65 to block 66, such as for example from hydraulic or gas pressure in the cavity 73, will cause bending of the flat portions 67b and 69b giving rise to a signal in each of the pairs of strain gages 70 and 70a. The signals may be accumulated by appropriate circuitry and transmitted to an indicator to conveniently indicate the resulting deflection or load. Also, under some conditions the cylinder 64 may be subjected to torque loads such as would occur if it were used as a drive shaft. In such event, the torque on cylinder 64 will cause bending of the portions 67c and 69c, giving rise to a signal in each of the pairs of strain gages 70b and 70c. These signals may then be accumulated by appropriate circuitry and transmitted to an indicator for conveniently indicating the torque load.

The load cell illustrated in FIG. 7 is an alternative embodiment of the FIG. 6 illustration where only axial loads are measured. In the FIG. 7 illustration, four thin metal strips 76, 77, 78 and 79 are fixed at points 90 degrees apart to blocks 65a of the ring 65 by clamping members 65b and screws 65c. The strips have base portions 76a, 77a, 78a and 79a which are fixed by the clamping members 65b to the ring blocks 65a. The strips have apex portions 76b, 77b, 78b and 79b which are fixed to an upper and lower center blocks 80 pressurably held together by screws 81. The center blocks 80 may be fastened by a screw 71 to lug 71a of FIG. 6 or it may be left as a central opening which might, for example, be a die in an extrusion press or a wire drawing die. The strips have pairs of notches 82, 83, 84 and 85 creating portions of reduced cross section which bend more readily under axial load than the remainder of the strips. Pairs of strain gages, for example, gages 86 are mounted on the upper and lower surfaces of each strip. In this case the load cell may be considered as made up of two beams having right angle legs attached to the outer ring 65 and a rigid apex portion 80 consisting of the connected portions 76a, 79a and the center block 80, for example. In such case, the other right angle beam would consist of the connected portions 77a, 78a and the center block 80.

Axial loads at the center block 80 will cause bending primarily at the notches 82, 83, 84 and 85, resulting in a signal in each of the pairs of strain gages 86 which may be accumulated and transmitted to an indicator to conveniently indicate the load.

This invention is not limited to the particular details of construction and operation herein described as equivalents will suggest themselves to those skilled in the art. For example, while in the present instance the load cell combinations are shown with bonded resistance strain gages, they may also be used with other means of sensing such as unbonded strain gages, linear variable differential transformers, optical and capacitive sensing devices and the like, the configurations of load columns in themselves having inherent merit. Also, the positioning and dimensioning of reduced area sections may be varied and the numbers of such reduced area sections may be increased or decreased to suit a particular load application.

What I claim is:

1. In a load cell having capacity for tension, compression and torque force measurement over a substantially similar range for each said force, the combination of at least two load sensing beams, each having a pair of base portions and an intermediate apex portion, said base portions and apex portions being relatively rigid in the direction of each said tension, compression and torque force to be measured, each of said beams including two portions which are relatively flexible to a substantially similar degree in the direction of each said tension, compression and torque force, and one of said flexible portions being disposed between its apex portion and each of its base portions.

2. The combination as in claim 1 wherein each of said flexible portions carry strain measuring means for measuring the strain from each said tension, compression and torque force.

3. The combination as in claim 2 wherein said strain measuring means are strain gages bonded to the flexible portions.

4. In a load cell having capacity for tension, compression and torque force measurement, the combination of at least two load sensing beams, each having a pair of base portions and an intermediate apex portion, said base portions and apex portions being relatively rigid in the direction of each said tension, compression and torque force to be measured, each of said beams including two portions which are relatively flexible in the direction of each said tension, compression and torque force, and one of said flexible portions being disposed between its apex portion and each of its base portions, said flexible portions having sides, and strain gages carried in pairs bonded one each of the sides of said flexible portions for measuring the strain from each said tension, compression and torque force.

5. The combination as in claim 3 with stop means positioned for limiting tension, compression and torque load deflection of said flexible portions to a selected maximum value.

6. The combination as in claim 1 wherein said beams are each curvilinear and connected end to end in the form of a ring having a periphery and a cross sectional area and with said portions which are relatively flexible in the direction of each said tension, compression and torque force being portions with depressions about said entire periphery for effecting reduced cross sectional area.

7. The combination as in claim 6 wherein a first cross member is coupled to the apices of said two beams and a second cross member is coupled to the bases of said two beams for applying said force to said beams.

8. In a load cell having capacity for tension, compression and torque force measurement, the combination of at least two curvilinear load sensing beams connected end to end in the form of a ring having a periphery and a cross sectional area, each said beam having a pair of base portions and an intermediate apex portion, said base portions and apex portions being relatively rigid in the direction of each said tension, compression and torque force, each of said beams including two portions with depressions about said entire periphery for effecting reduced cross sectional area which are relatively flexible in the direction of each said tension, compression and torque force, one of said flexible portions being disposed between the beam apex portion and each of the beam base portions, a first cross member coupled to the apices of said beams and a second cross member coupled to the bases of said two beams for applying said force to said beams, and each of said cross members having a tension, compression and torque load transmitting adapter substantially centrally of said ring for coupling to a load to be measured.

9. The combination as in claim 8 with a housing about said ring and means sealing said housing about said ring.

10. The combination as in claim 9 wherein the sealing means includes a flexible metallic diaphram.

11. The combination as in claim 8 wherein each said cross member has additionally a stress concentration notch on each side of said associated adapter and strain gages in said notches for strain measurement at said notches.

12. In a load cell for force measurement, the combination of curvilinear load sensing beams, each of said beams being a quarter circular section and connected end to end in the form of a ring, each beam having a pair of base portions and an intermediate apex portion, said base portions and apex portions being relatively rigid in the direction of the force to be measured, each of said beams including two portions with reduced cross sectional area which are relatively flexible in the direction of said force with one of said flexible portions being disposed between its apex portion and each of its base portions, a first cross member coupled to opposed base portions in said ring and a second cross member coupled to the other opposed base portions in said ring with each of said cross members having an adapter substantially centrally of the ring for coupling to a load to be measured, and a weight fixed to the apex of each of said beams for thereby providing added sensitivity at said flexible portions to accelerations and decelerations of said ring.

13. In a load cell for force measurement, the combination of at least two load sensing beans, each having a pair of base portions and an intermediate apex portion, each of the beams having legs of relatively flexible strip material at substantially right angles to each other extending from said apex portion, means rigidly fixing the apices in place adjacent each other with the legs extending therefrom to form a spider-like structure and the base portions being adapted for coupling to supports, and each of said legs having a quarter twist disposed between its apex and base portions for providing maximum sensitivity adjacent the base portions for axial loads and maximum sensitivity adjacent the apex portions for torque loads.

14. The combination as in claim 13 with pairs of strain gages bonded to each of the sides of the strip material adjacent both said base portions and said vertex portions of the beams.

15. In a load cell for force measurement, the combination of a rigid center member for receiving a force to be measured, a plurality of force sensing arms of strip material extending radially from said center member to form a spider-like structure, each of said force sensing arms having a base portion distal from said center member adapted for anchoring to a support and a ninety degree twist between said center member and base portion for providing strain sensitivity to both an axial force and a torque force, and strain measuring means on each of said force sensing arms for measuring strain in the respective arm from such force.

References Cited

UNITED STATES PATENTS

| | | | |
|---|---|---|---|
| 2,377,212 | 5/1945 | Cottrell | 73—517 |
| 2,403,952 | 7/1946 | Ruge | 73—136 |
| 3,136,157 | 6/1964 | Seed et al. | 73—141 |
| 3,205,706 | 9/1965 | Tracy | 73—141 |
| 3,272,006 | 9/1966 | Eckard | 73—141 |
| 3,295,377 | 1/1967 | Richard | 73—517 |
| 3,303,452 | 2/1967 | Booth | 73—141 XR |

FOREIGN PATENTS 1,358,231  3/1964  France.

CHARLES A. RUEHL, *Primary Examiner.*

U.S. Cl. X.R.

73—398, 517